(12) United States Patent
Chatterjee et al.

(10) Patent No.: US 7,010,793 B1
(45) Date of Patent: Mar. 7, 2006

(54) PROVIDING AN EXCLUSIVE VIEW OF A SHARED RESOURCE

(75) Inventors: Surojit Chatterjee, Belmont, CA (US); Jonathan Creighton, Oakland, CA (US); Alok Srivastava, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 795 days.

(21) Appl. No.: 09/960,006

(22) Filed: Sep. 20, 2001

Related U.S. Application Data (60) Provisional application No. 60/240,165, filed on Oct. 12, 2000.

(51) Int. Cl.
*G06F 9/44* (2006.01)

(52) U.S. Cl. ...................................... 719/316; 719/318

(58) Field of Classification Search ........ 719/312–318; 718/100, 104; 709/212–216, 202–203
See application file for complete search history.

(56) References Cited

U.S. PATENT DOCUMENTS

| | | | | |
|---|---|---|---|---|
| 5,608,909 A | * | 3/1997 | Atkinson et al. | 719/315 |
| 5,819,281 A | * | 10/1998 | Cummins | 707/103 R |
| 5,991,536 A | * | 11/1999 | Brodsky et al. | 717/104 |
| 6,363,435 B1 | * | 3/2002 | Fernando et al. | 719/318 |
| 6,438,618 B1 | * | 8/2002 | Lortz et al. | 719/318 |
| 6,748,455 B1 | * | 6/2004 | Hinson et al. | 719/318 |
| 6,775,658 B1 | * | 8/2004 | Zothner | 706/47 |
| 6,782,541 B1 | * | 8/2004 | Cohen et al. | 719/318 |

* cited by examiner

*Primary Examiner*—St. John Courtenay, III
*Assistant Examiner*—G. Lawrence Opie
(74) *Attorney, Agent, or Firm*—Marcel K. Bingham; Hickman Palermo Truong & Becker LLP (57) ABSTRACT

Described herein is a mechanism that follows, at least in part, an object oriented design pattern. In particular, a class is used to model a shared resource as a shared resource object. The class creates one instance of the shared resource object in response to multiple attempts to create a shared resource object from the class. The class defines various methods used to interact with the object. The object receives requests to perform operations from the clients. The clients may register another object to receive from the shared resource object notifications regarding events about the operations requested by the clients.

18 Claims, 4 Drawing Sheets

PROVIDING AN EXCLUSIVE VIEW OF A SHARED RESOURCE

RELATED APPLICATION

This application claims priority to Provisional Application No. 60/240,165, entitled "A New Object Oriented Framework to Provide an Exclusive View of a Shared Resource That Implements Efficient Task Scheduling and Monitoring in Distributed Systems With Bounded Resources", filed on Oct. 12, 2000 by Surojit Chatterjee, et al., the contents of which incorporated by reference in its entirety.

FIELD OF THE INVENTION

The present invention relates to object oriented programming, and in particular, design patterns used in object oriented programming.

BACKGROUND OF THE INVENTION

Designers in many disciplines, from architects to electrical engineers, have developed patterns that describe solutions to commonly encountered problems. For example, there is a large body of pattern literature for constructing residences, covering almost all aspects of building a home—from framing, plumbing, to electrical wiring. This pattern literature has been in existence for years.

Patterns have taken root in software only recently. "Design Pattern Elements of Reusable Object-Oriented Software," by Gamma, et al., is the first landmark work that addresses patterns for software. It was not published until 1995. This work is commonly referred to as the GANGOF4BOOK.

Design patterns, as the term is used herein, describe objected-oriented programming solutions to commonly encountered problems and issues. Design patterns are important for improving the quality of software because design patterns provide a framework for solving fundamental challenges in software system development. Design patterns describe solutions developed by the icons of software development, communicate established solutions to developers at large, and avoid development traps and pitfalls that are usually learned by experience. Objected-oriented programming is described in Appendix A.

An example of a design pattern is an iterator. The iterator design pattern addresses the commonly encountered problem of sequentially accessing each number of a collection of objects, such as an array of objects. The iterator design pattern describes a solution for sequentially traversing objects in an underlying data structure without having to be concerned with the particular data structure. Specifically, the iterator design pattern specifies that an iterator object maintains a current position in the data structure. The iterator object should also have a method that (1) returns a reference to the object in the next position, and (2) sets the current position to the next position, if any.

Another commonly encountered problem is providing concurrent access to a shared resource. Shared resources include, but are not limited to, shared memory, data structures, and peripheral devices. Solutions for concurrently accessing a shared resource involve explicit cooperation between the various executing entities (e.g. processes, threads) accessing the shared resource. These solutions typically use various locking mechanisms, such as locks, monitors, and mutexes, to coordinate access to the shared resource.

Developing software to implement explicit cooperation between processes and threads can be very cumbersome and tedious. Generally, it is substantially easier to develop software for accessing resources that are not shared by processes or threads.

A methodology that allows a process or thread to access a shared resource, as if that resource were not shared, would relieve a developer of the complicated work of developing software that must provide explicit cooperation between processes and threads for accessing a shared resource. Currently, there is no design pattern that describes such a solution. Clearly, such a design pattern is desirable.

SUMMARY OF THE INVENTION

Described herein is a mechanism that follows, at least in part, an object oriented design pattern. According to an aspect of the present invention, a class is used to model a shared resource as a shared resource object. The class creates one instance of the shared resource object in response to multiple attempts to create a shared resource object from the class. The class defines various methods used to interact with the shared resource object. The shared resource object receives requests to perform operations from the clients. The clients may register to receive from the shared resource object notifications regarding events about the operations requested by the clients.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for accessing shared resources are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

A design pattern is a described that provides a client with an exclusive view of a shared resource. A client has an exclusive view of a shared resource when the client may interact with the shared resource as if the resource is not shared by any other client, or in other words, as if the client had exclusive use of the shared resource. This design pattern is referred to herein as the exclusive view design pattern. However, the advantages offered by the design pattern are not limited to providing an exclusive view.

The design pattern describes various classes, objects created from the classes, and the behavior of those objects, including interactions between them. Among these items include a class used to establish a shared resource as an object and define various methods used to interact with the object. The design pattern also describes various other classes used to establish objects.

One aspect of the object implemented as a shared resource is that the object receives requests to perform operations from clients. The design pattern defines mechanisms that allow a client to monitor the execution of a requested operation. In addition, the design pattern may be used to bound resources used in a computer system to perform a particular type of operation. A resource used to perform a particular type of operation is bounded on a computer system when the amount of that resource used to perform a particular type of task system-wide is capable of being confined. For example, when the number of threads used to monitor a particular network connection may be limited system-wide, then the threads used to perform that type of operation are bounded.

Illustrative Exclusive View Design Pattern

Figure 1:
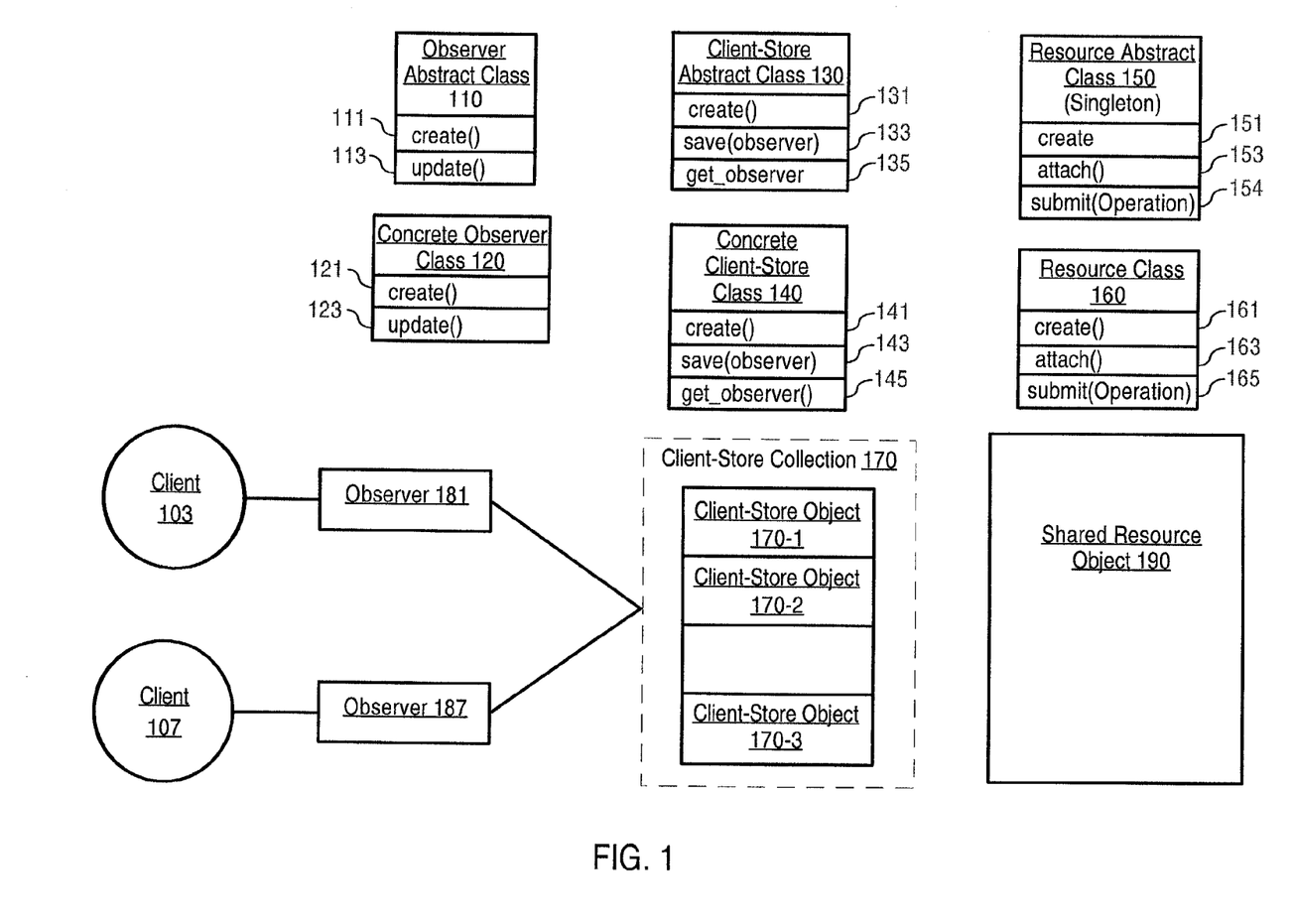
FIG. 1 is a block diagram depicting classes and objects specified by a design pattern according to an embodiment of the present invention.

FIG. 1 is a block diagram that depicts an exclusive view design pattern according to an embodiment of the present invention, and in particular, that describes classes and instances of classes that participate in the design pattern.

Referring to FIG. 1, clients 103 and 107 are executing entities that request operations involving a shared resource object 190. Clients 103 and 107 are, for example, threads running within the same process or different processes, or different processes located on different remote machines. The operations may be executed concurrently by shared resource object 190. Clients 103 and 107 request operations by invoking a method of shared resource object 190.

A shared resource object, such as shared resource object 190, is an instance of a concrete resource class, such as concrete resource class 160. A concrete resource class is a subclass of resource abstract class 150. Resource abstract class 150 is an abstraction of a shared resource. It defines an interface, i.e. a set of methods, through which clients may interact with a shared resource as an object. A concrete resource class implements the methods of the interface for a particular shared resource. The methods are implemented in a manner customized for a particular shared resource, thereby encapsulating many of the operations performed to access or use a particular resource. These operations include those performed to manage concurrent access.

The set of methods defined by resource abstract class 150 include create 151, attach 153, and submit 154. Create 151 is a constructor method. It should be invoked whenever a process or thread attempts to create an instance. The method also returns a reference to an instance. Submit 154 is a method used by a client to request the execution of an operation. Submit 154 has one parameter, Operation, which specifies the operation requested. Attach 153 is used to register an object referred to as an observer. As shall be described in greater detail, such objects are sent notifications about events related to operations requested by the clients registering the objects.

As a subclass of resource abstract class 150, concrete resource class 160 inherits methods create 151, attach 153, and submit 154 as create 161, attach 163, and submit 165, respectively. Concrete resource class 160 defines an implementation for each of the inherited methods in a manner customized for a particular shared resource.

Resource abstract class 150 is defined as a singleton class. Accordingly, a concrete resource class is a singleton class. A singleton class is a class that will only generate one instance of itself in response to multiple requests to create an instance. Shared resource object 190 is that one instance.

The following example is provided to illustrate the operation of a singleton class. Client 103 invokes create 161, creating shared resource object 190 as an instance of concrete resource class 160. The invocation of create 161 returns to client 103 a reference value referring to shared resource object 190. Next, client 107 invokes create 161. Because concrete shared resource object 190 already exists, another instance of concrete resource class 160 is not created. However, the invocation of create 161 returns a reference value referring to concrete shared resource object 190 to client 107.

Because concrete resource class 160 is a singleton class, shared resource object 190 will be the only instance created for the class. Thus, shared resource object 190 controls all client usage of the shared resource for which shared resource object 190 has been implemented, enabling shared resource object 190 to manage concurrent access to the shared resource, as well as other aspects of interactions with the shared resource.

Observer Classes and Objects

Observer abstract class 110 defines an interface for observers. The interface includes create 111 and update 123. Create 111 is a constructor method invoked to create an observer. The method returns a reference value to the observer. Update 123 is invoked by a shared resource object to transmit notifications about events regarding operations requested by the clients who register the observer.

A concrete observer class, such as concrete observer class 120, is a subclass of observer abstract class 110 that implements the interfaces that are customized for particular clients. Concrete observer class 120 implements create 111 as create 121 and update 113 as update 123.

Observer 181 is an instance of concrete observer class 120. Observer 181 is instantiated by client 103, who registers observer 181 with shared resource object 190. Consequently, notifications about events requested by client 103 are transmitted to observer 181. While FIG. 1 depicts one observer registered by client 103, a client may instantiate and register more than one observer.

How observer 181 processes these notifications depends on how concrete observer class 120 is implemented. Concrete observer class 120 may be implemented so that an instance of it transmits information about notifications to the client 103 that creates the instance. Or, concrete observer class 120 may be implemented so that an instance of the class transmits information about the notification to entities other than client 103.

Observer 187 is also an instance created by client 107 of a concrete observer class. FIG. 1 depicts observers 187 and 181 as being instances of the concrete observer class 120. However, this is not required. An observer may be an instance of any concrete observer class.

Client Specific Storage

Client-store abstract class 130 defines interfaces for objects that hold information about a particular client that is using a shared resource object. Such objects are referred to herein as client-store objects. A client-store object may contain information about a client, such as a reference value to a collection of observers registered by the client.

The interface defined by client-store abstract class 130 includes create 131, save 133, and get_observer 135. Create 131 is a constructor method invoked to create a client-store object. The method returns a reference value to the client-store object. Save 133 is invoked by a shared resource object to add an observer to the collection of observers maintained by a client-store object for a client. Get_observer 135 is invoked to get a reference to the collection of observers.

A concrete client-store class, such as concrete client-store class 140, is a subclass of client-store abstract class 130. A concrete client-store class implements the interface defined by a client-store abstract class for a particular shared resource object. Concrete client-store class 140 implements create 131 as create 141, save 133 as save 143, and get_observer 135 as get_observer 145.

Similar to a concrete resource class or a concrete observer class, the implementation of a concrete client-store class may be customized to a particular shared resource object.

Shared resource object 190 contains client-store collection 170. A client-store collection is a collection of client-store objects. Client-store collection 170 is a collection of client-store objects 170-1 through 170-N.

Object Interaction

Figure 2:
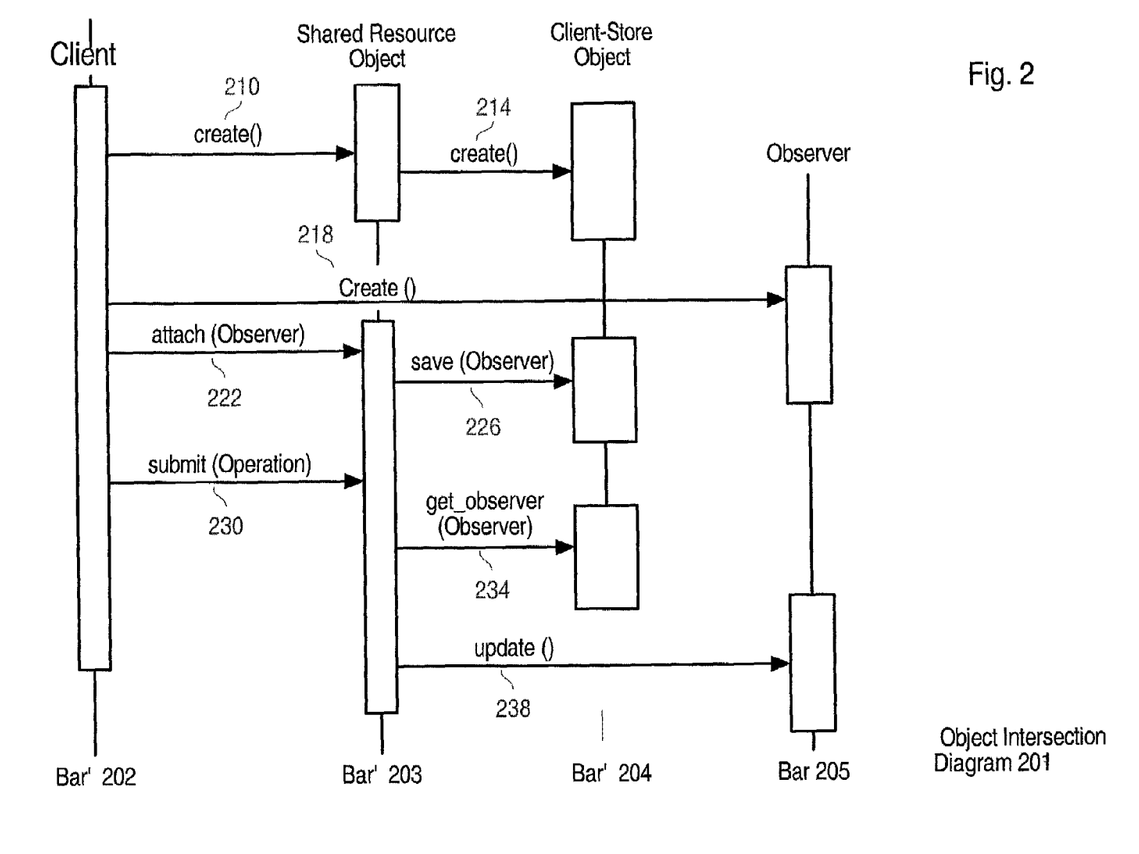
FIG. 2 is a object interaction diagram depicting interaction between objects in the design pattern.

FIG. 2 shows object interaction diagram 201, which depicts interaction between objects that follow a design pattern according to an embodiment of the present invention. Object interaction diagram 201 depicts bars that each correspond to a client or an object belonging to a particular class. Bar 202 corresponds to a client, bar 203 corresponds to a shared resource object, and bar 204 corresponds to a client-store object, and bar 205 corresponds to an observer.

The vertical lines represent messages transmitted between objects. In many object-oriented systems, messages typically correspond to method invocations. The interaction between objects in the design pattern depicted by object interaction diagram 201 will be illustrated as method invocations.

Referring to FIG. 2, at invocation 210, the client invokes the create method of a concrete resource class. A shared resource object is created if it does not already exist, and a reference to the shared resource object is returned to the client.

At invocation 214, the shared resource object invokes the create method of the concrete client-store class, creating a client-store object for the client who invoked the create method of the shared resource object at invocation 210. The client-store object is added to the client-store object collection contained in the shared resource object.

At invocation 218, the client invokes the create method of the concrete observer class, creating an observer. The method returns a reference value to the observer.

At invocation 222, to register the observer, the client invokes the attach method of the shared resource object, passing to the shared resource object the reference value of the observer. In response, the shared resource object invokes the save method of the client-store object for the client, passing in the reference value. The client-store object then saves the reference value. At invocation 230, the client invokes the submit method of the shared resource object to request the execution of an operation.

While executing the operation for a client, the shared resource object detects an event of which to notify the client's registered observers. At invocation 234, the shared resource object invokes the get_Observer method of the client-store object of the client. In response, the client-store object of the client returns the reference value to the observer.

At invocation 238, the shared resource object invokes the update method of an observer to notify it of the event.

Distributed Copying Illustration

Figure 3:
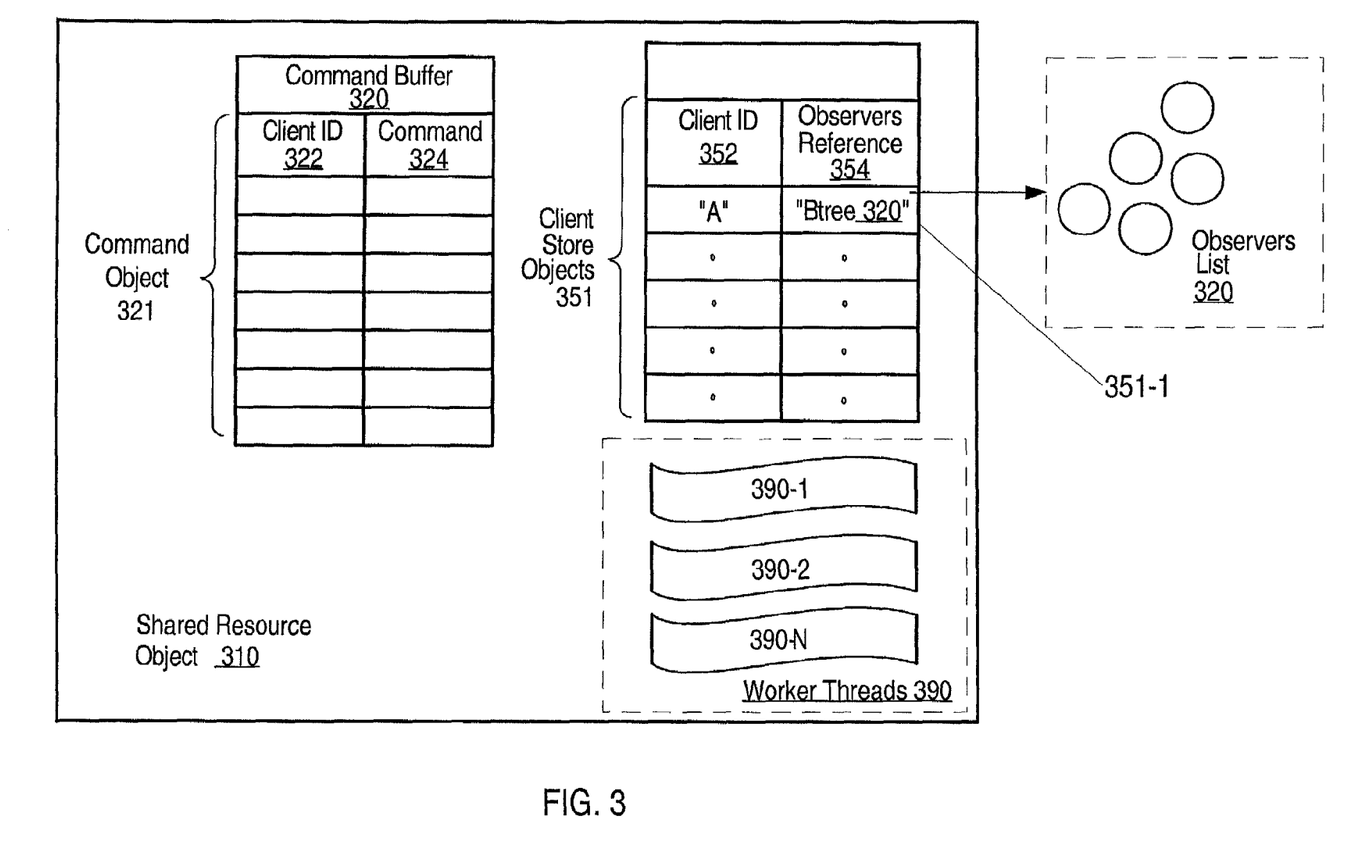
FIG. 3 is a block diagram depicting an implementation of the design pattern according to an embodiment of the present invention.

FIG. 3 is an example application of the exclusive view design pattern. The example is based on shared resources, used to copy files in a distributed system, that are implemented as a shared resource object. In general, the shared resource object receives requests from clients to copy files to other nodes in a distributed system. The commands specify the files to copy. The shared resource object executes commands, using threads to concurrently copy the files to all nodes on the distributed system. The resource object handles the details of the concurrent copying.

Referring to FIG. 3, it depicts a shared resource object 310, which is an instance of a concrete resource class. Shared resource object 310 contains command buffer 320, client-store collection 350, and worker threads 390. Command buffer 320 is an ordered set of command objects. Command objects are instances of a command class. Command buffer 320 is depicted as a table with rows that each correspond to a command object and columns that each correspond to an attribute of the command object. Client id 322 is an attribute that identifies the client; command 324 is an attribute that identifies a subtask for the operation requested by a client. Command buffer 320 serves as a task list of tasks to be executed by threads.

Client id 322 may be set to any value that can be used to identify a client. For example, in a Java™ virtual machine, the client id may be the thread name that invoked the method submit 165 of shared resource object 310. The thread name may be retrieved by invoking a method of the thread that called method submit 165. Alternatively, an identifier to identify the client may be passed as a parameter value when the client submits the operation to shared resource object 310.

The operations requested are composite operations. A composite operation is an operation that is broken down into multiple subtasks. When shared resource object 310 receives a request to copy a file from a client to many nodes, shared resource object 310 breaks down the operation into multiple subtasks to many nodes, each subtask entailing the copying of the file to a particular node. Shared resource object 310 creates a command object for each subtask. The attribute client id 322 is set to the client id of the client. The attribute command 324 is set to a value that specifies the constituent subtask assigned to the command object.

Worker threads 390 include worker threads 390-1 through 390-N. The worker threads are managed by shared resource object 310 to execute a command object, that is, to perform the subtask specified by the command attribute of the command object. The shared resource object assigns a command object to a worker thread for execution. A worker thread executes one command object at time.

Client-store collection 350 is a collection of client-store objects 351 that belong to a concrete client-store class. Client-store collection 350 is depicted as a table with rows that each correspond to a client-store object and columns that each correspond to attributes defined by the concrete client-store class. Client id 352 corresponds to an attribute that identifies the client associated with a client-store object. Client id 352 in client-store object 351-1 contains the value A identifying a client A. Observers reference 354 is an attribute containing a reference value to a list of observers. Observers reference 354 of client-store object 351-1 contains the value "B-TREE 380", which identifies observers list 380.

Observers list 320 is a list of observers in the form of a binary tree, and contains observers registered by client A. When shared resource object 310 receives a request from client A to register an observer, shared resource object 310 invokes the method save 143 of client-store object 351-1. In response, client-store collection 350 adds the observer to observers list 380. When client-store object 351-1 first receives such a request, it creates observers list 380 and a reference value to it, which is stored in the observers reference 354 of client-store object 351-1.

When a worker thread completes a subtask for a client, the resource object notifies the observers registered by the client. Specifically, when a worker thread finishes a subtask, the shared resource object 310 determines the identity of the client who requested the subtasks operation. The identity is determined by examining the attribute client id 322 of the command object associated with the subtask. Next, shared resource object 310 determines which client-store object is associated with the client by finding the client-store object whose client id 352 value identifies the client. Once found, shared resource object 310 invokes the method get_observer 145 of the client-store object. The method returns a reference to the observers list for the client. Shared resource object 310 then invokes method update 123 of each observer in the list to notify the observer of the completion of the subtask.

As each subtask is completed, the method update 123 of each observer in observers list 380 is invoked, notifying the observer of the completion of the subtask. In this way, shared resource object 310 provides intermediate status information regarding the execution of an operation requested by a client.

Providing Shared Resources and an Exclusive View

The distributed file copy system described in FIG. 3 illustrates advantages that may be achieved by following the exclusive view design pattern. These advantages include a client's exclusive view of the shared resources used to perform the subtask of copying files to other nodes—shared resources in the form of command buffer 320 and worker threads 390. A client simply submits a request to the shared resource object 310 to perform an operation. The request is made without regard to whether other clients can concurrently request operations for the shared resource object 310, that is, made as if there were no other clients that could access the shared resource object and the resources contained therein. The shared resource object 310 handles the subtask of concurrently adding subtasks as command objects to the command buffer 320, and managing the concurrent execution of the operations by the worker threads 390.

Another way an exclusive view of a shared resource is realized is that observers registered by a client are only notified of events related to operations requested by the client. In this way, the client has an exclusive view of an event generating object shared by multiple clients. Furthermore, observers of multiple clients are notified asynchronously.

Shared resource object 310 also is able to bound resources used by numerous clients to perform the common operation of copying files to other nodes. In a system that that did not bound resources, each client might create their own subtask list and set of threads to copy the files to other nodes. The quantity of resources used to perform this type of operation at a particular moment depends on the number of clients performing the type of operation at that moment.

In contrast, shared resource object 310 controls the resources that are used to copy the files. Shared resource object 310 performs the operations on behalf of the clients and manages the resources used to perform the operations. Thus, the quantity of resources used to perform the operation of copying files to distributed nodes is bounded to those controlled by shared resource object 310.

There are other advantages that may be derived from management of shared resource object 310 over resources used to perform a particular type of operation. For example, because shared resource object 310 manages threads that execute that type of operation, it can efficiently schedule the execution of copying files to other nodes.

Design Pattern Variations

The exclusive view design pattern is a framework which covers many variations. The following is a description of some of these variations.

In the distributed copying illustration, clients may register observers for notification for one type of event, that is, the completion of a subtask for an operation requested by the client. However, in other variations, a client may register for different types of events. Examples of such events include completion of the entire operation requested by a client, or the encountering of an error condition.

Variations of a resource abstract class may be used to support client registration of different types of events. For example, a resource abstract class may define an interface that includes two attach methods to register an observer for two different events. Or, an attach method may be defined to accept a value for a parameter specifying a particular event. In the case of an observer registered in this way for a particular event, a shared resource object passes a parameter value to the observer when the shared resource object notifies the object about the event. The parameter value identifies the event.

A shared resource object may perform more than one type of operation. For example, a shared resource object 310 may be configured to accept requests to delete files as well as copy them.

Variations of a resource abstract class may be used to support client registration of different events to support different ways of requesting multiple operations. For example, a resource abstract class may define different methods that are invoked to submit different operations. Or, a resource abstract class may define a method that accepts a parameter value that identifies the type of operation.

Finally, the exclusive view design pattern has been illustrated using objects that could be implemented using non-object oriented paradigms. For example, a command buffer 320 and command objects 321 may instead be implemented as an array of data structures having elements corresponding to attributes client id 322 and command 324.

Hardware Overview

Figure 4:
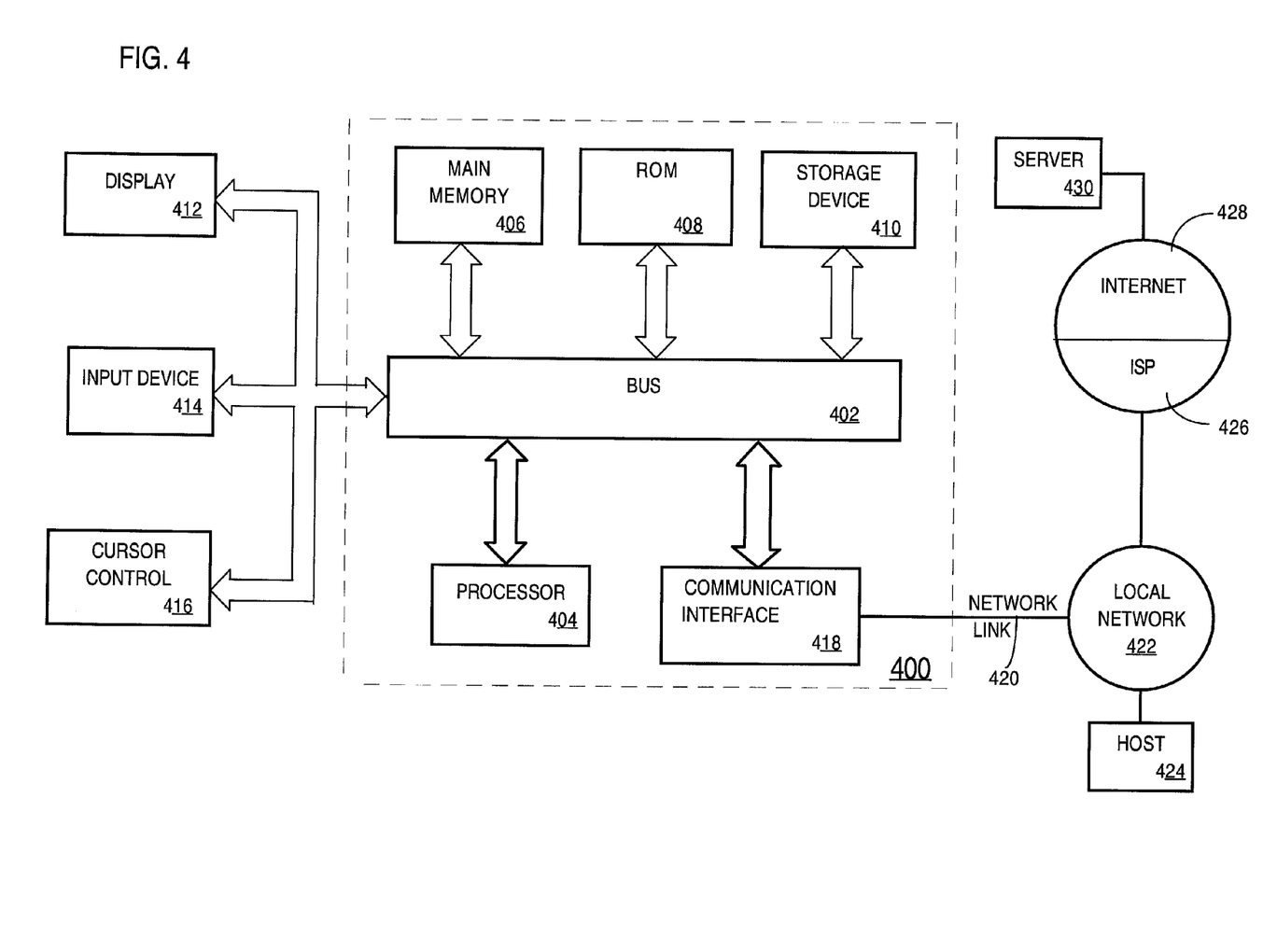
FIG. 4 is a computer system that that may be used to implement an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic store device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Object Oriented Terminology

In object oriented programming, the world is modeled in terms of objects. An object is a record combined with the procedures and functions that manipulate it. All objects of a class have the same fields, and are manipulated by the same procedures and functions ("methods"). An object is said to be an "instance" of the class to which it belongs.

Sometimes an application requires the use of classes that are similar, but not identical. For example, the classes used to model both dolphins and dogs might include the fields for the nose, mouth, length and age. However, the dog class may require a hair color field, while the dolphin class requires a fin size field.

To facilitate programming in situations in which an application requires multiple similar fields, object oriented programming supports "inheritance". Without inheritance, a programmer would have to write one set of code for the dog class, and a second set of code for the dolphin class. The code implementing the fields and methods common to object classes would appear redundantly in both classes. Duplicating code in this manner is very inefficient, especially when the number of common fields and methods is much greater than the number of unique fields. Further, code duplication between classes complicates the process of revising the code, since changes to a common fields will have to be duplicated at multiple places in the code in order to maintain consistency between all classes that have the field.

Inheritance allows a hierarchy to be established between classes. The fields and methods of a class automatically become fields and methods of the classes that are based upon the given class in the hierarchy. For example, an "animal" class may be defined to have nose, mouth, length and age fields, with associated methods. To add these fields and methods to the dolphin and dog classes, a programmer can specify that the dolphin and dog classes "inherit" the animal class. A class which inherits its fields and methods from another class is said to be a subclass of the other class. The other class, the class from which the subclass inherited its fields and methods, is said to be a parent class. In this example, the dolphin and dog classes are "subclasses" of the animal class, and the animal class is a parent class of the dog and dolphin classes.

The code for the inherited fields and methods is located in the parent class and is not duplicated in any subclasses. The subclasses only contain the code for fields and methods that supplement or override the fields and methods of the parent class. Consequently, all revisions to a parent class automatically apply to all subclasses. For example, if the field "age" is defined as an integer in the animal class and is not overridden in the dog and dolphin classes, then the dog and dolphin classes will include an integer to store an age value. If the animal class is revised so that "age" is defined as a real number, then the dog and dolphin classes will automatically include a real number to store an age value.

Note a third or greater level in a hierarchy of a classes can be established. A given class can inherit fields and methods of a class that is itself a subclass of another class. A class above a particular class in a hierarchy is said be a super class to that particular class. Thus a parent class is a super class to its subclasses, and a super class to any class inheriting from a subclass of that parent class.

Methods and Abstract Classes

The methods of classes accept zero or more parameters. A constructor, which is similar to a method, is used to initialize the fields of an object when objects belonging to that class are created.

The code containing the instructions to perform the operations associated with a method is said to be an implementation of the method. A method may be defined for a class without an implementation. A method with no implementation is said to be an abstract method; a class which contains an abstract method is said to be an abstract class.

Abstract classes are useful for establishing a common interface for the subclasses of abstract classes. The interface for an abstract method establishes the name of the method, the data type returned by a method and the data type of the method's parameters. The subclasses of an abstract class is responsible for providing the implementation of the abstract method.

For example, assume that it is desired that all objects provide an interface which includes a method that indicates the number of legs an animal has. An abstract class, named animal, with an abstract method called get_legs that returns an integer representing the number of legs can be defined. Every subclass of the animal class would be responsible for providing code which implements the get_legs method for the particular type of animal represented by the subclass. For example, a cow subclass would provide a specific implementation for get_legs that returned the integer four when the get_legs method of a cow object was invoked.

The fields and methods of a class are defined by a class definition in software. Class definitions contained in software are typically created from source code usually received from a programmer. The source code is compiled into the code which can be executed by a computer system. For example, a programmer using a Java Development Kit enters source code in the Java programming language into a source file. The source code embodies class definitions and other instructions which are used to generate byte code which control the execution of a Java code executor, a virtual machine. The JAVA™ virtual machine is described in detail in "The JAVA™ Virtual Machine Specification," by Tim Lindholm and Frank Yellin (Sun Microsystems, Inc.: Addison-Wesley Publishing Co.). The JAVA™ programming language is described in detail in "The JAVA™ Language Specification," by James Gosling, Bill Joy and Guy Steele (Sun Microsystems, Inc.: Addison-Wesley Publishing Co.), and related texts in the JAVA™ Series published by Addison-Wesley.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing a shared object in an object-oriented environment, the method comprising the steps of:
generating only a single instance of said shared object in response to attempts by a plurality of clients to create an instance of a particular object belonging to a class to which said shared object belongs;
registering a plurality of observer objects by invoking, for each observer object of said plurality of observer objects, a first method of said shared object to register said each observer object to notify about an event related to an execution requested by a first client of a particular operation;
wherein said plurality of clients include the first client;
each client of said plurality of clients invoking a second method of said shared object to request execution of said particular operation; and
when the shared object performs the execution requested by the first client of the particular operation, said shared object sending a first message about a first event related to the execution requested by said first client to each observer object that has been registered to notify about an event related to the execution requested by said first client of a particular operation.

2. The method of claim 1, wherein the steps further include sending a second message about another event related to the execution requested by the first client of the particular operation to an observer object that was registered by said first client.

3. The method of claim 2, wherein:
the step of each client of said plurality of clients invoking a second method includes said first client invoking said second method to request execution of a first operation that includes a first subtask and a second subtask;
wherein the first message to the observer object registered by the first client is sent in response to completing execution of the first subtask; and
wherein the second message to the observer object registered by the first client is sent in response to completing execution of the second subtask.

4. A tangible computer-readable medium carrying one or more sequences of instructions which, when executed by one or more processors, causes the one or more processors to perform the method recited in claim 3.

5. A tangible computer-readable medium carrying one or more sequences of instructions which, when executed by one or more processors, causes the one or more processors to perform the method recited in claim 2.

6. The method of claim 1, further including the step of the first client invoking another method of said shared object to register another observer object about another event related to the execution requested by said first client of said particular operation; and
wherein said other method is different than said first method.

7. A tangible computer-readable medium carrying one or more sequences of instructions which, when executed by one or more processors, causes the one or more processors to perform the method recited in claim 6.

8. The method of claim 1, further including the step of said shared object creating, for each client of said plurality of clients, a client specific object that stores data associated with said each client.

9. The method of claim 8, wherein the method further includes invoking a particular method of said client specific object created for said first client that returns information that may be used to access an observer object that was registered by said first client.

10. A tangible computer-readable medium carrying one or more sequences of instructions which, when executed by one or more processors, causes the one or more processors to perform the method recited in claim 9.

11. The method of claim 8, wherein the steps further include:
said shared object invoking a method of said client specific object; and
in response to said shared object invoking the method of said client specific object, storing a reference value to an observer object for said first client.

12. A tangible computer-readable medium carrying one or more sequences of instructions which, when executed by one or more processors, causes the one or more processors to perform the method recited in claim 11.

13. The method of claim 8, wherein the step of invoking the method of said client specific object is performed in response to the attempt by said first client to create an instance of a particular object belonging to a class to which said shared object belongs.

14. A tangible computer-readable medium carrying one or more sequences of instructions which, when executed by one or more processors, causes the one or more processors to perform the method recited in claim 13.

15. A tangible computer-readable medium carrying one or more sequences of instructions which, when executed by one or more processors, causes the one or more processors to perform the method recited in claim 8.

16. The method of claim 1, wherein the steps include:
for each client of said plurality of clients, performing the following steps when the shared object performs the execution requested by said first client of the particular operation:
identifying said each client;
determining whether said each client has registered an observer object about the event related to the execution requested by said first client of the particular operation; and
if said each client has registered an observer object, then sending a first message to said observer object by invoking said second method of said observer object.

17. A tangible computer-readable medium carrying one or more sequences of instructions which, when executed by one or more processors, causes the one or more processors to perform the method recited in claim 16.

18. A tangible computer-readable medium carrying one or more sequences of instructions which, when executed by one or more processors, causes the one or more processors to perform the method recited in claim 1.

* * * * *